United States Patent [19]

Hempel

[11] Patent Number: 5,236,204
[45] Date of Patent: Aug. 17, 1993

[54] BELLOWS MADE OF THERMOPLASTIC ELASTOMER

[75] Inventor: Jürgen Hempel, Weinheim, Fed. Rep. of Germany

[73] Assignee: Carl Freudenberg, Weinheim an der Bergstrasse, Fed. Rep. of Germany

[21] Appl. No.: 776,833

[22] Filed: Oct. 15, 1991

[30] Foreign Application Priority Data

Nov. 24, 1990 [DE] Fed. Rep. of Germany ....... 4037482

[51] Int. Cl.$^5$ ............................. B61F 15/22; F16J 9/08
[52] U.S. Cl. ............................................. 277/212 FB
[58] Field of Search .................... 92/34, 42, 46, 47; 277/212 FB; 156/244.14, 245; 264/516

[56] References Cited

U.S. PATENT DOCUMENTS

| | | | |
|---|---|---|---|
| 4,121,844 | 10/1978 | Nemoto et al. | 277/212 FB |
| 4,713,207 | 12/1987 | Udell et al. | 264/516 X |
| 4,852,891 | 8/1989 | Sugiura et al. | 277/212 FB X |
| 4,856,795 | 8/1989 | DeLano et al. | 277/212 FB |
| 4,936,811 | 6/1990 | Baker | 277/212 FB X |
| 5,078,652 | 1/1992 | Baker | 277/212 FB X |
| 5,147,064 | 9/1992 | Jonkers et al. | 264/516 X |

Primary Examiner—Edward K. Look
Assistant Examiner—John Ryznic
Attorney, Agent, or Firm—Felfe & Lynch

[57] ABSTRACT

A bellows made of thermoplastic elastomer material comprises clamping sections at opposite ends of the bellows, where at least one of the clamping sections consists of elastomeric material which is permanently bonded to the thermoplastic elastomer material.

3 Claims, 7 Drawing Sheets

BELLOWS MADE OF THERMOPLASTIC ELASTOMER

FIELD OF THE INVENTION

This invention relates to a bellows made of thermoplastic elastomer which has clamping sections at opposite ends, at least one of which consists of elastomeric material which is permanently bonded to the thermoplastic elastomer.

BACKGROUND OF THE INVENTION

German Offenlegungsschrift No. 33 09 386 discloses a bellows, the clamping sections of which are configured by procedures during their production so that they have an elasticity which the thermoplastic material itself does not possess. This elasticity is intended to keep the clamping sections airtight over a longer period of time and to provide for a constant firm seat.

In recent times those parts of bellows which do not include the clamping sections are most often made of a thermoplastic elastomer material. This material is inexpensive to work and satisfies most of the requirements, especially in the automobile industry, with respect to mechanical properties and chemical stability against mineral oils and moisture.

On the other hand, a disadvantage of this material is that it has about twice a high a compression set as elastomer mixtures. Also, there is the problem of cold flow, which is a negative property especially for the clamping sections of bellows.

In an attempt to remedy this problem, self-tightening band clamps are used, or a rubber base is cemented under the band clamp. This special configuration of the clamping sections, however, adds significantly to the cost of manufacture of the bellows.

Furthermore, when the band clamps are tightened, the pressure around the entire circumference of the clamping section is not uniformly distributed, and pressure peaks are produced which lead to premature destruction of the thermoplastic elastomer material.

When thermoplastic elastomers are used in the manufacture of bellows, it often happens, especially when thermal stress is involved, that the material "squeezes out" from under the clamps at both ends of the bellows, so that the clamp can become loose. This phenomenon in conjunction with thermoplastic materials is known as "cold flow."

OBJECT OF THE INVENTION

It is an object of the present invention to provide a bellows the clamping sections of which can be fastened with band clamps without destroying the thermoplastic elastomer material and without the need for any special material or manufacturing expense.

Other objects and advantages of the present invention will become apparent as the description thereof proceeds.

DESCRIPTION OF THE INVENTION

I have discovered that the above object is achieved by means of a bellows made of thermoplastic elastomer in which at least one of the clamping sections at opposite ends consists mainly of an elastomeric, rubber-like material which is permanently bonded to the thermoplastic elastomer material.

Preferred material pairs for the thermoplastic elastomeric material and the elastomer of the clamping sections are polymer alloys of polypropylene and ethylene-propylene-diene terpolymer (EPDM)/styrene-butadiene-rubber or ethylene-propylene-diene terpolymers. If the thermoplastic elastomer consists of a polyether ester, the clamping sections are preferably made of urethane rubber.

"Polymer alloys" is the general term for all mixtures of polymers, even if an additional reaction takes place during their preparation.

Material pairs with the above polymer alloys as thermoplastic elastomeric components are especially suitable for the purpose of the present invention because, due to the similar components in rubber-like materials, an optimum bonding of the two polymers is achieved in the hot state, comparable to welding.

Examples of suitable polyether esters are block polymers of polyterephthalic acid esters and polyalkylene glycols (commercially available from E.I. duPont de Nemours & Company, Inc. under the trademark HYTREL) with molecular weights up to 25,000.

Urethane rubbers, such as thermoplastic polyurethanes with polyester as polyol component or urethane rubber mixtures on a polyester basis, can be bonded best with these materials.

The advantage of the elastomer material at the clamping section of the bellows resides mainly in a low compression set and in the fact that it is possible by the appropriate selection of the material pairs to produce a permanent bond between the materials without an adhesive while the bellows is being made.

The thermoplastic elastomers of which the actual bellows are made, are known materials. Their molecules consist of two different polymer segments, one of which is a stiff, so-called "hard" segment, and the other is an elastic, soft segment. The polymer segments are formed from longer chains of similar building blocks (monomers).

The hard segments hold the soft segments together by physical, net-like bonds until at higher temperatures the hard segments fuse and the entire material can be thermoplastically shaped and worked. In this state it can be permanently bonded to other elastomeric rubber-like materials. Upon cooling, the physical cross linking occurs again, and then the elastomeric properties predominate.

Technically, the bellows may be produced by injection blowing, injection extrusion or extrusion blow-molding, where the ring-shaped parts of rubber are previously inserted into the mold at the two future clamping sections. When the blank is blown into the mold, the thermoplastic material presses against the mold wall and thus against the rubber rings, while a permanent bond is formed between the two materials.

Before the introduction of the thermoplastic elastomeric material, the rubber rings are simply placed onto the blow mandrels of the extrusion or blow-molding apparatus. This can be done simultaneously or at various stages of manufacture. The cross section of the rings may be of any desired shape, which will be ultimately determined by the manufacturing costs of the molded product.

The manufacturing process of the novel bellows of the present invention will now be further explained with reference to the attached drawings.

BRIEF DESCRIPTION OF THE DRAWINGS

FIG. 2 shows the insertion of the rubber rings;

FIG. 3 shows the injection into the cavity of the mandrel;

FIG. 4 shows the extrusion of the blank;

FIG. 5 shows the closing of the mold; and

FIG. 6 shows the inflation of the bellows.

Figure 1:
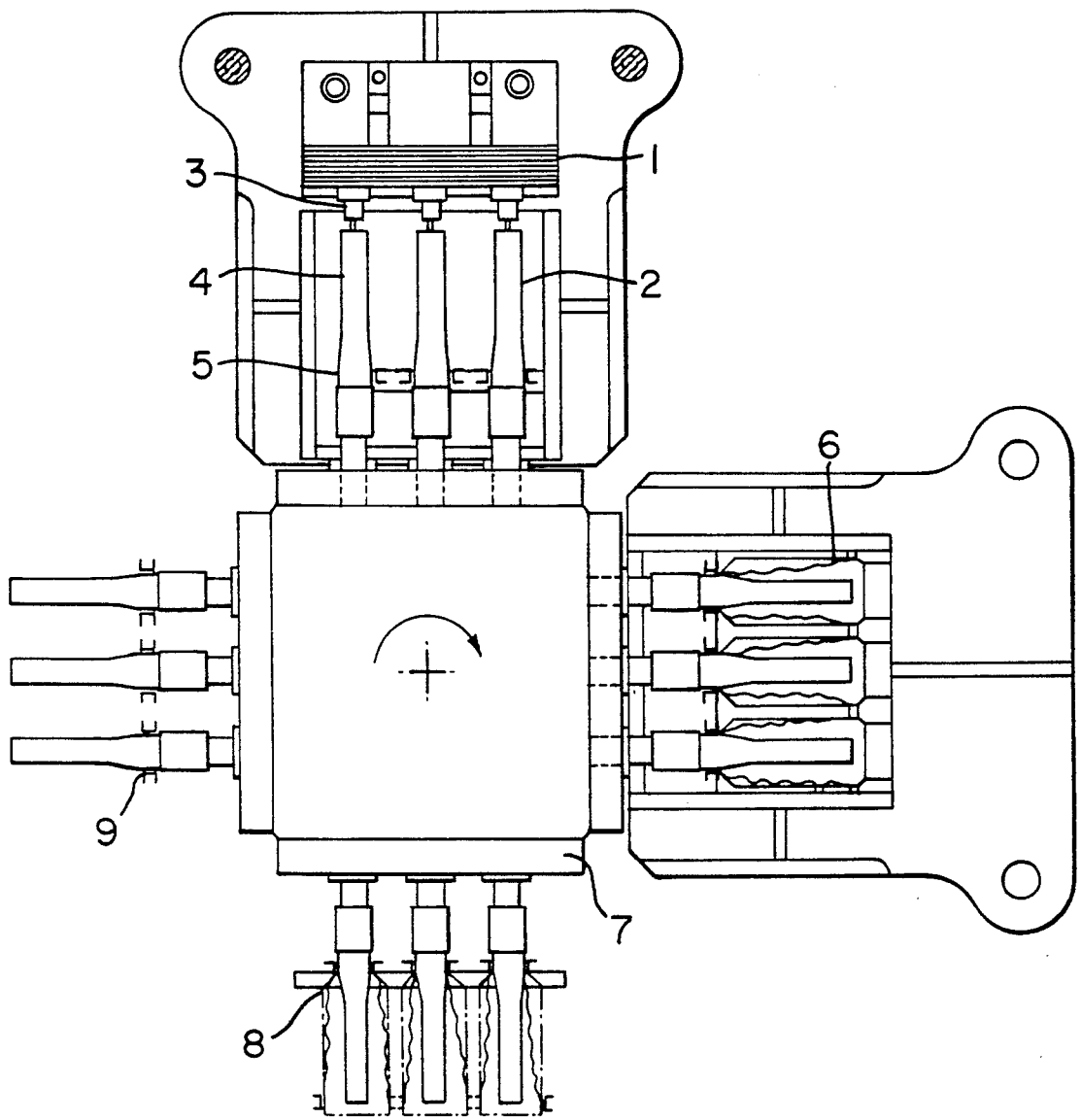
FIG. 1 is a schematic representation of an injection blow-molding apparatus for the manufacture of the bellows of the instant invention.

Referring first to FIG. 1, the injection blow-molding apparatus comprises a heating manifold 1, an injection blowing cluster 2, an injection nozzle 3, a die core with mandrel 4, elastomer ring 5, the bellows contour 6, a turntable 7, the finished bellows 8, and a cooling station 9.

The injection molding of the blank takes place in the position marked with reference numerals 1 to 5. Following in the direction of the arrow, the blank is inflated in the next position, the bellows are stripped off at the subsequent clockwise position, and the apparatus is cooled at the last of the four positions.

In the case of injection blowing, the rubber ring 5 for the smaller clamping section of the bellows can already have been drawn onto the mandrels 4 in the cooling position 9 of the apparatus. Since thermoplastic material has to be injected between mandrel 4 and rubber ring 5, the rubber ring is held in place by a positioning device which is fastened on the mandrel 4. The apparatus is now rotated into the injection position, and the blank is injection molded. The narrower clamping section of the bellows is thereby already fully formed. The apparatus is then rotated to the blowing position, where the rubber ring of the opposite clamping section is inserted. By inflating the blank, the bellows receives its final form, and the thermoplastic material is forced against the rubber ring where it enters into a permanent bond with the latter.

In the case of injection extrusion (FIGS. 2 to 6), the procedure is similar. As in the case of injection blowing, the thermoplastic elastomer is bonded to the rubber ring at the clamping section, and at the opposite clamping section it is pressed by the pressure of the blowing air against the rubber ring which is located there, and is bonded to the rubber ring.

Figure 2:
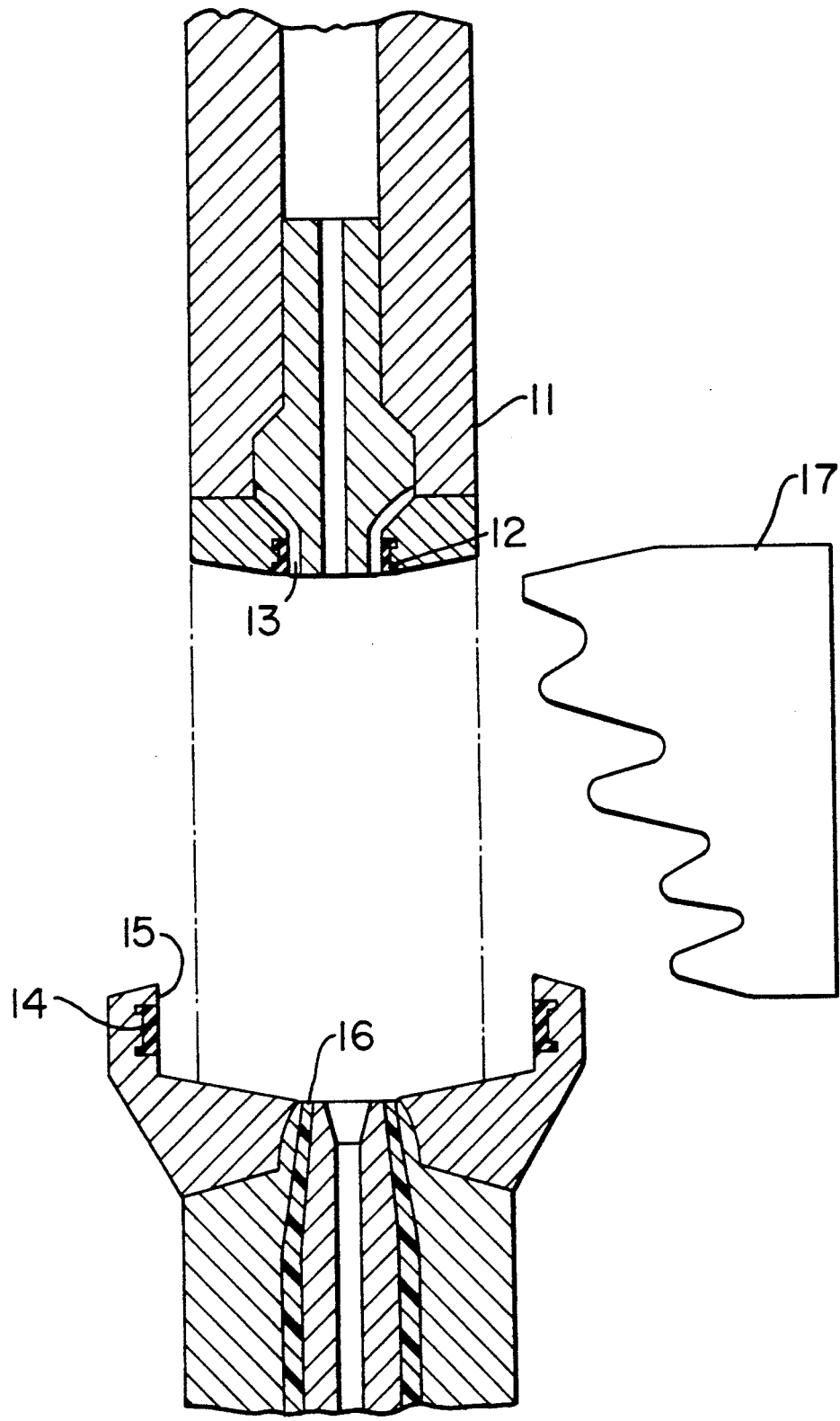
FIGS. 2 to 6 show diagrammatically an injection extruder in various working positions.
Figure 3:
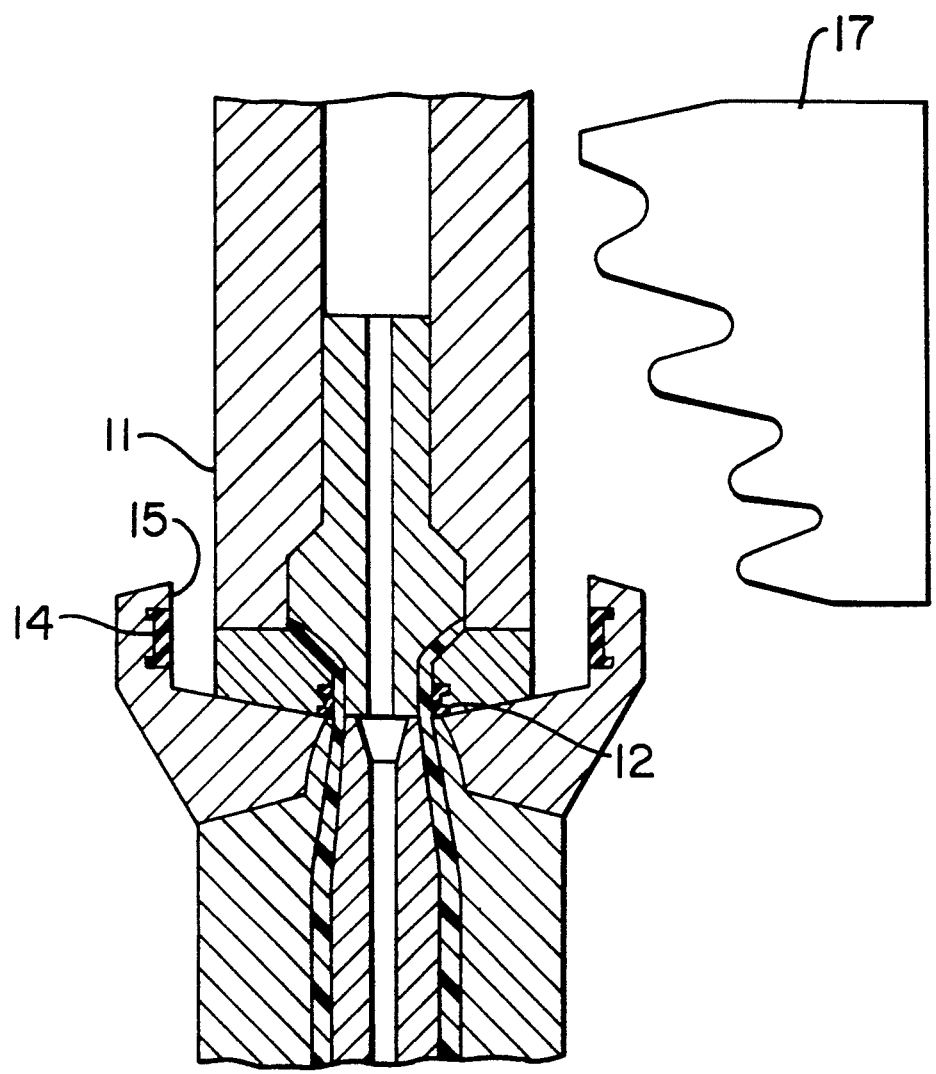
Figure 4:
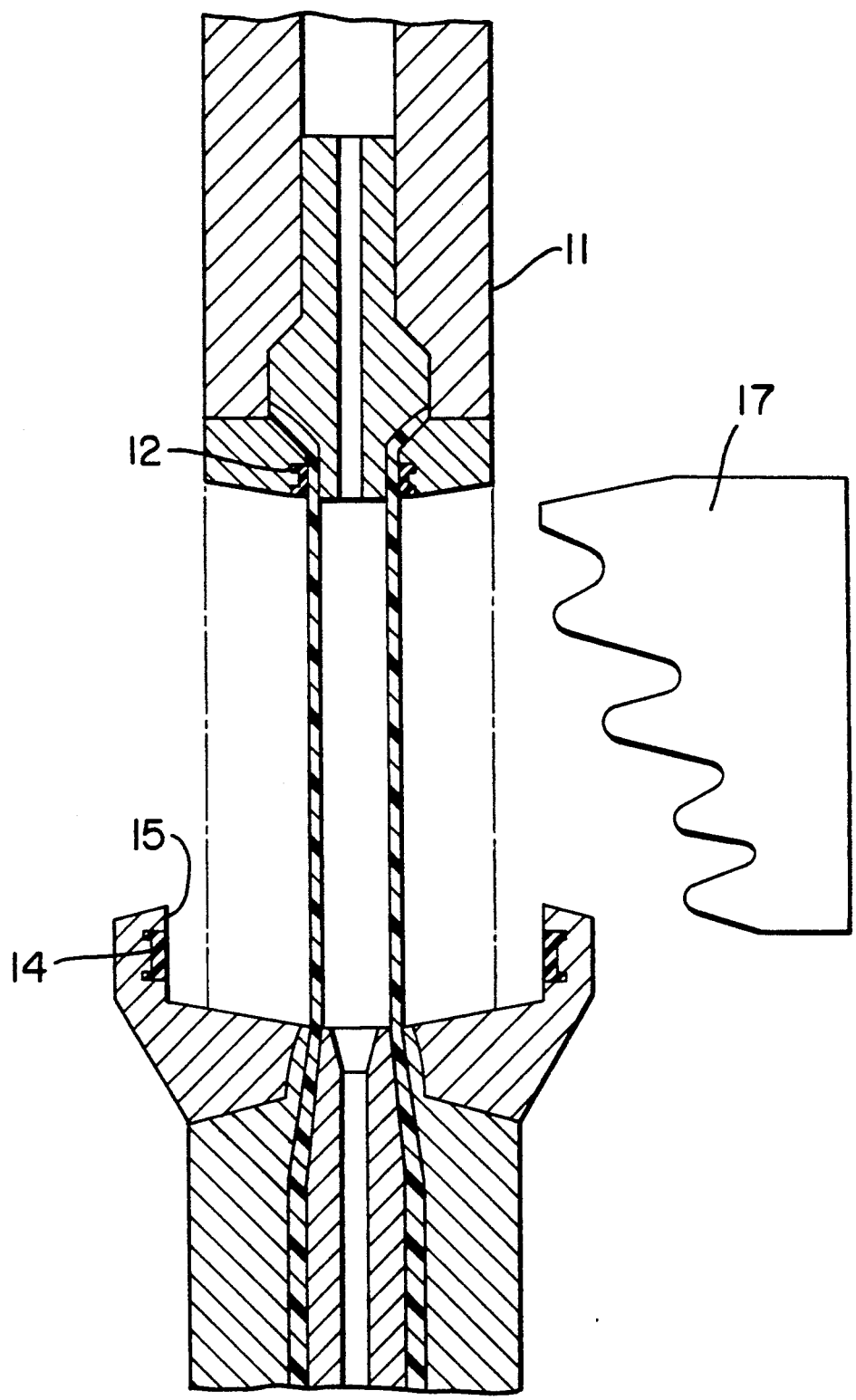
Figure 5:
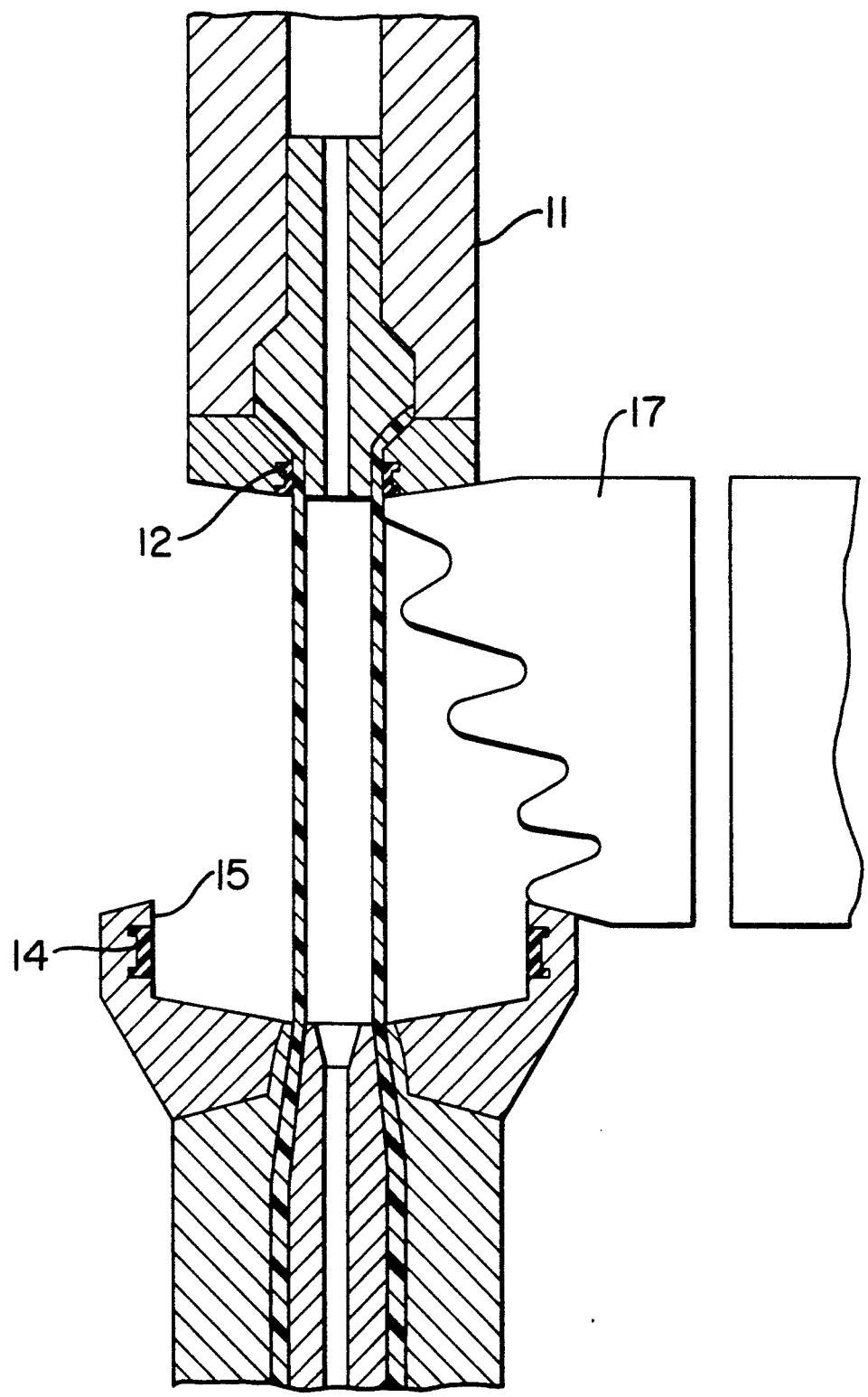
Figure 6:
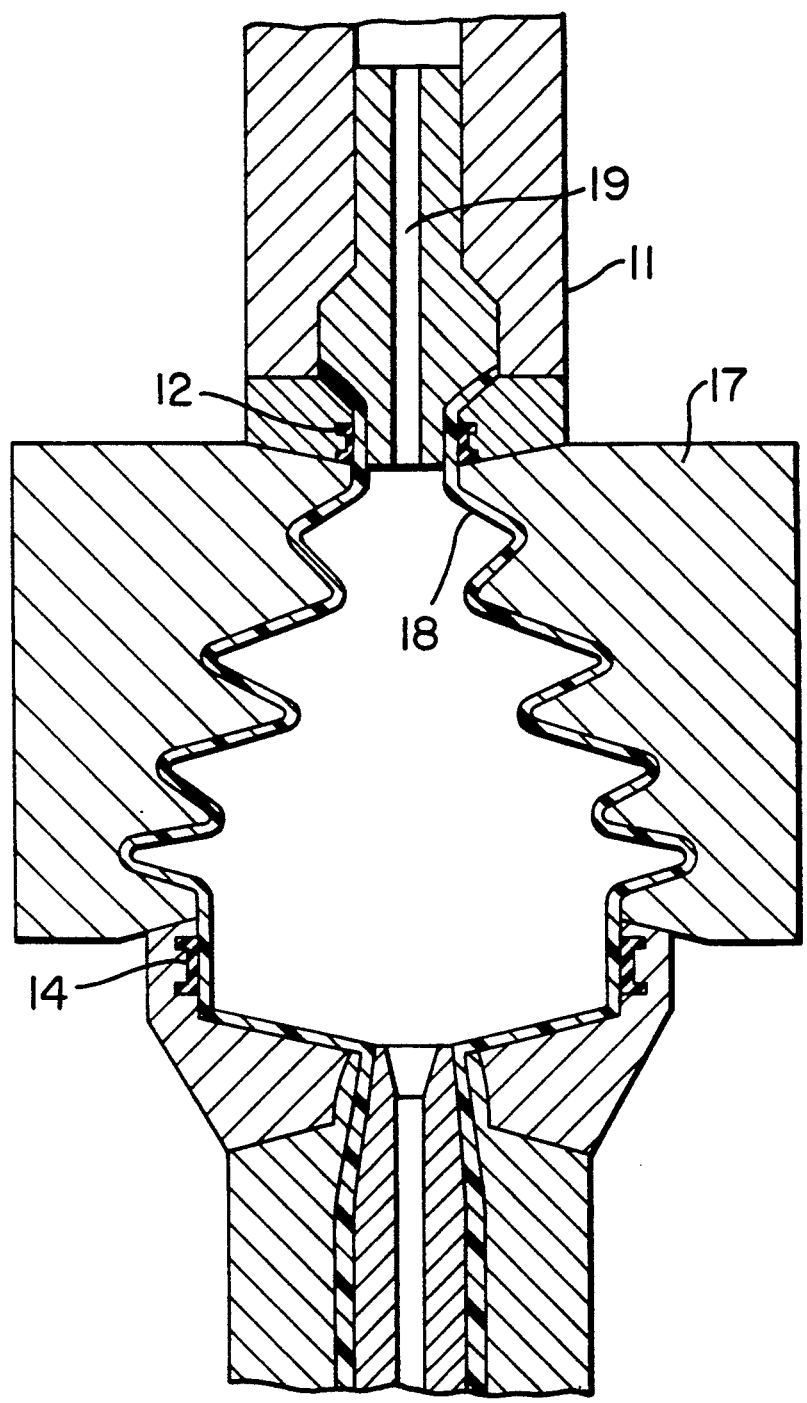
Figure 7:
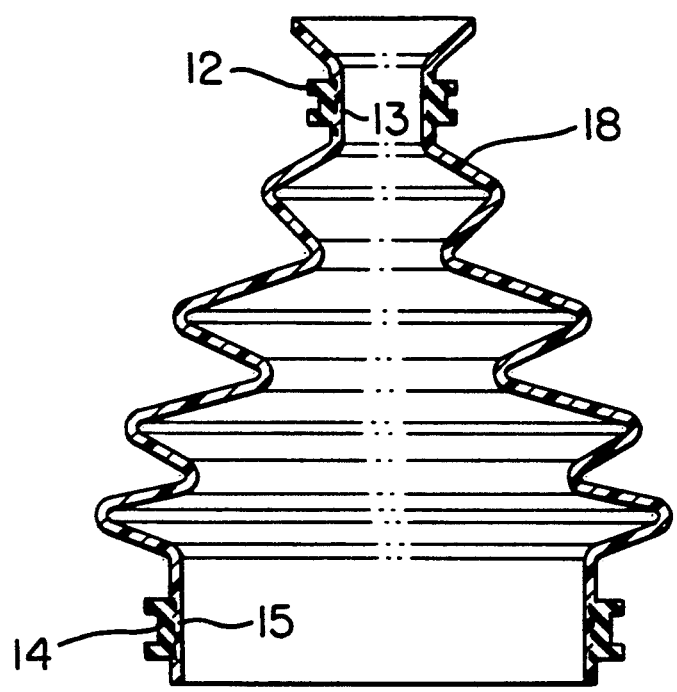
FIG. 7 is a longitudinal cross-section of a finished bellows.

FIG. 2 shows how the mandrel 11 is in the upper position after the finished bellows is stripped from it. There, the rubber ring for the thinner bellows cross section can be inserted into the injection extrusion die for the thin, upper clamping section 13. At the same time the rubber 14 for the lower larger clamping section 15 can also be inserted. Thereafter, the process continues as follows:

The mandrel 11 comprising the injection molding die moves to the nozzle 16, the thin clamping section 13 is injected (FIG. 3), the mandrel 11 is moved upwardly (FIG. 4), the blow mold 17 closes (FIG. 5), and the bellows 18 is shaped by injecting the blowing air 19 (FIG. 6). Simultaneously, as in the case of injection blowing, the thermoplastic elastomer material is bonded to the rubber ring 12 by injection at the smaller clamping section, and at the larger clamping section 15 it is forced against the rubber ring 14 by the pressure of the blowing air (FIG. 7).

With the present invention it is also possible to do extrusion blow-molding. The installation of the rubber ring is in this case slightly more complicated, since it has to be drawn over the extruded tube hanging from the nozzle. Also, preference is to be given to injection blow-molding and injection extrusion because these methods have been available for a long time.

The phenomenon of "cold flow" in thermoplastic materials, mentioned in the beginning of the description, occurs to a far lesser extent in crosslinked elastomeric materials. In the present invention, therefore, this property of the elastomers is utilized precisely at the section on the bellows where it is needed. The invention will find preferred application in areas where in addition to the clamping forces, still higher temperatures are involved. This is the case, for example, in bellows for protecting universal joints.

While the present invention has been illustrated with the aid of certain specific embodiments thereof, it will readily apparent to others skilled in the art that the invention is not limited to these particular embodiments, and that various changes and modification may be made without departing from the spirit of the invention or the scope of the appended claims.

I claim:

1. A bellows made of thermoplastic elastomer material having an upper end and a lower end, said bellows comprising a clamping section on each of said upper and lower ends, at least one of said clamping sections consisting of elastomeric material which is permanently bonded to said thermoplastic elastomer material.

2. A bellows of claim 1, wherein said thermoplastic elastomer is a polymer alloy of polypropylene and EPDM, and said clamping sections consist of styrene-butadiene-rubber or ethylene-propylene-diene terpolymer.

3. A bellows of claim 1, wherein said thermoplastic elastomer is a polyether ester and said clamping sections consist of urethane rubber.

* * * * *